(12) United States Patent
Lee et al.

(10) Patent No.: US 8,862,810 B2
(45) Date of Patent: Oct. 14, 2014

(54) SOLID STATE DEVICE WRITE OPERATION MANAGEMENT SYSTEM

(71) Applicant: Arkologic Limited, Fremont, CA (US)

(72) Inventors: Ronald Lee, Pleasanton, CA (US); Henry C. Lau, Fremont, CA (US); Rajesh Ananthanarayanan, San Jose, CA (US)

(73) Assignee: Arkologic Limited, Fremont, CA (US)

( * ) Notice: Subject to any disclaimer, the term of this patent is extended or adjusted under 35 U.S.C. 154(b) by 34 days.

(21) Appl. No.: 13/629,386

(22) Filed: Sep. 27, 2012

(65) Prior Publication Data

US 2014/0089565 A1 Mar. 27, 2014

(51) Int. Cl.
*G06F 12/02* (2006.01)
(52) U.S. Cl.
CPC .................................. *G06F 12/0246* (2013.01)
USPC .......................................................... 711/103
(58) Field of Classification Search
None
See application file for complete search history.

(56) References Cited

PUBLICATIONS

Sun Microsystems Inc., "ZFS On-Disk Specification," 2006, (55 pages).
Wikipedia, the free encyclopedia. "Solid-state drive." Available at: http://en.wikipedia.org/wiki/Solid-state_drive. Accessed Dec. 21, 2012, (26 pages).

*Primary Examiner* — Kevin Verbrugge
(74) *Attorney, Agent, or Firm* — Perkins Coie LLP (57) ABSTRACT

A solid state device (SSD) write operation management system including a file system that incorporates SSD status information into its operational logic is disclosed. By incorporating SSD status information, the system achieves various advantages over conventional systems, such as enhanced write performance and extended SSD lifespan. The system processes various criteria to select the optimal virtual device ("vdev") for data allocation in response to a write request. The first criterion utilizes Program/Erase counts of physical blocks contained in the SSDs. Another criterion is the number of physical free blocks of a drive. If the average of the selected vdev's physical free blocks is higher than the OP threshold, then the system selects for data allocation the vdev with the greatest amount of logical free space. In the instance that the average is lower, the system schedules garbage collection for the vdev.

28 Claims, 10 Drawing Sheets

| | | Physical Free Space | Logical Free Space | Max P/E Count | Average P/E Count | Garbage Collection Enabled | Garbage Collection In Process? |
|---|---|---|---|---|---|---|---|
| 605a | vdev0 | 459776 MB | 467876 MB | | 177.8 | Enabled | FALSE |
| 615a | disk0 | 57984 MB | 58472 MB | 381 | 152 | Enabled | FALSE |
| 615b | disk1 | 58368 MB | 58487 MB | 467 | 246 | Enabled | FALSE |
| 615c | disk2 | 56192 MB | 58485 MB | 372 | 142 | Enabled | FALSE |
| 615d | disk3 | 56320 MB | 58491 MB | 425 | 149 | Enabled | FALSE |
| 615e | disk4 | 58240 MB | 58485 MB | 416 | 151 | Enabled | FALSE |
| 615f | disk5 | 26448 MB | 58482 MB | 445 | 148 | Enabled | FALSE |
| 615g | disk6 | 57984 MB | 58491 MB | 489 | 252 | Enabled | FALSE |
| 615h | disk7 | 58240 MB | 58482 MB | 454 | 179 | Enabled | FALSE |
| 605b | vdev1 | 286848 MB | 292981 MB | | 185.8 | Disabled | FALSE |
| 620a | disk0 | 58240 MB | 58587 MB | 515 | 190 | Disabled | FALSE |
| 620b | disk1 | 57984 MB | 58595 MB | 666 | 271 | Disabled | FALSE |
| 620c | disk2 | 57984 MB | 58600 MB | 528 | 159 | Disabled | FALSE |
| 620d | disk3 | 57728 MB | 58595 MB | 443 | 157 | Disabled | FALSE |
| 620e | disk4 | 54912 MB | 58604 MB | 434 | 152 | Disabled | FALSE |
| 605c | vdev2 | 174592 MB | 175537 MB | | 250 | Enabled | TRUE |
| 625a | disk0 | 57984 MB | 58508 MB | 661 | 310 | Enabled | TRUE |
| 625b | disk1 | 58496 MB | 58511 MB | 405 | 159 | Disabled | FALSE |
| 625c | disk2 | 58112 MB | 58518 MB | 665 | 281 | Enabled | TRUE |

*FIG. 11*

SOLID STATE DEVICE WRITE OPERATION MANAGEMENT SYSTEM

BACKGROUND

Solid-state drives (herein "SSDs") store data persistently in solid-state memory such as NAND flash memory. SSDs offer advantages over traditional hard disk drives (herein "HDDs"), such as improved resistance to mechanical shock, lower power consumption, and faster access times. SSDs have a different set of operating constraints than hard disk drives. As a first example, SSDs can be programmed with high granularity (e.g., at the byte or word level), but must be erased with far less granularity (e.g., at the block level). As a second example, SSDs typically require that a write operation span physically sequential flash pages. As a third example, SSDs have longer erase times than read times or write times. As a fourth example, each block in an SSD can only endure a limited number of erase cycles.

Many storage devices, including SSDs, are used in conjunction with file systems which provide procedures to store, retrieve, and modify data. Other responsibilities of the file system include ensuring data integrity and controlling access to data. File systems are often tuned to the specific characteristics of the storage device. File systems organize the data stored on storage devices in an efficient manner and also manage the available space on the storage devices. Some file systems use storage virtualization to organize data and manage available space. Storage virtualization creates one or more virtual partitions (virtual devices) of the physical storage device, and abstracts the virtual devices (herein "vdevs") from the physical storage device. This separation allows the administrators of a storage system greater flexibility in how they manage storage for end users. For example, a file system allows an administrator to concatenate data partitions into larger virtual ones to move data, potentially without interrupting system use.

DETAILED DESCRIPTION

Data allocation is central to any file system. Data allocation refers in part to the file system's responsibility to determine where particular physical blocks of data and free space are located within a storage device. Different file systems use various techniques to perform data allocation. One technique for performing data allocation uses a bitmap. A bitmap is an array of bits, with the Nth bit indicating whether the Nth physical block is allocated or free. Accordingly, the overhead for a bitmap is one bit per physical block. For a 1 GB storage device, the bitmap is 32 KB. This bitmap fits easily in memory and can be scanned quickly to find whether a block is allocated (herein "allocations") or free (herein "frees"). For a 1 PB storage device, however, the bitmap is 32 GB; a file of that size will not fit in the memory of many modern computing systems. In addition, scanning a 32 GB file requires time to read it from RAM that adds significantly to computational time.

Another way for a file system to represent whether a physical block is allocated or free is with a binary tree (B-tree) of extents. A binary tree is a tree data structure in which each node has zero or two child nodes, usually distinguished as "left" and "right." The node which a child node references to is called its "parent" node. A root node is the ancestor of all other nodes. Operations on a B-tree require comparisons between values at a given node. Values that are less than the value of a given node's value go to the left child of that node, while values that are greater than the node go to the right child of that node. Any value can be reached by starting at the root node and repeatedly following references to either the left or right node. An extent represents a contiguous region of space which contains offset and length data, with the offset representing a value of how far the region of space is from a reference point. The B-tree sorts the extents by offset and a free block can be found by navigating through the B-tree. B-trees, however, must be updated not only when a block is allocated, but also when a block is freed. Under this method, while the file system has control over where data should be allocated, it has no control over where frees should be allocated. Because of the random locations at which frees occur, one side of a B-tree can become much "taller" than the other side, leading to slow searching.

Still another file system method divides the space on each virtual device into hundreds of regions called metaslabs. Each metaslab has an associated space map which describes that metaslab's free space. The space map is a log of blocks that have been allocated and freed in time order. Extents are appended to the space map object, and because extents describe a given space's offset, the file system achieves perfect locality. When this file system decides to allocate blocks from a particular metaslab, it first reads that metaslab's space map from disk and replays the allocations and frees into an in-memory AVL tree (a balanced B-tree) of free space, sorted by offset. This yields a compact in-memory representation of free space that supports efficient allocation of contiguous space.

The inventors have discovered that many file systems that are used with SSDs, including those mentioned above, fail to incorporate information about the status of the SSD into their operational logic. Failure to incorporate this information often results in inefficiencies in processes such as data allocation. In response to these discoveries and other shortcomings of conventional systems, the inventors have developed an SSD write operation management system (herein "the system") that incorporates different SSD-related factors (both file system and physical storage information) to select an optimal vdev for data allocation. By incorporating both file system and physical storage information, the system may achieve various advantages over conventional systems, such as enhanced input/output performance and extended SSD lifespan.

The system processes various criteria to select the optimal vdev for data allocation in response to a write request. The first criterion utilizes Program/Erase (herein "P/E") counts of physical blocks contained in the drives. P/E counts represent how many times a particular block within an SSD has been erased. One potential disadvantage of SSDs is that the individual blocks can be put through a limited number of erase cycles before becoming unreliable. An estimate of the number of cycles is known as the End of Life (EOL) threshold. The system maintains P/E counts of blocks contained within the SSD and monitors them in order to delay the EOL threshold from being reached for each block. In the event that the disparity of P/E counts between vdevs exceeds a P/E count threshold, the system selects a vdev that is mapped to the drive with the lowest P/E counts.

Another criterion used by the system to select the optimal vdev for data allocation is the number of physical free blocks of a drive. This criterion analyzes a vdev after the P/E count criterion. File systems ensure that a drive has sufficient physical free blocks in order to store data. In addition to this, the present system seeks to calculate the average number of physical free blocks of a selected vdev. The system then compares this against an over-provisioning (herein "OP") threshold that specifies an amount of space by which the physical capacity of the SSD should exceed the logical capacity presented through the file system as available to the user. By maintaining OP of a drive, a file system preserves free space needed to perform background garbage collection, thus increasing performance. If the average of the selected vdev's physical free blocks is higher than the OP threshold, then the system selects for data allocation the vdev with the greatest amount of logical free space. In the instance that the average is lower, the system schedules garbage collection for the vdev. This allows the vdev to be optimized for subsequent data allocations.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

SSD Write Operation Management System

Figure 1:
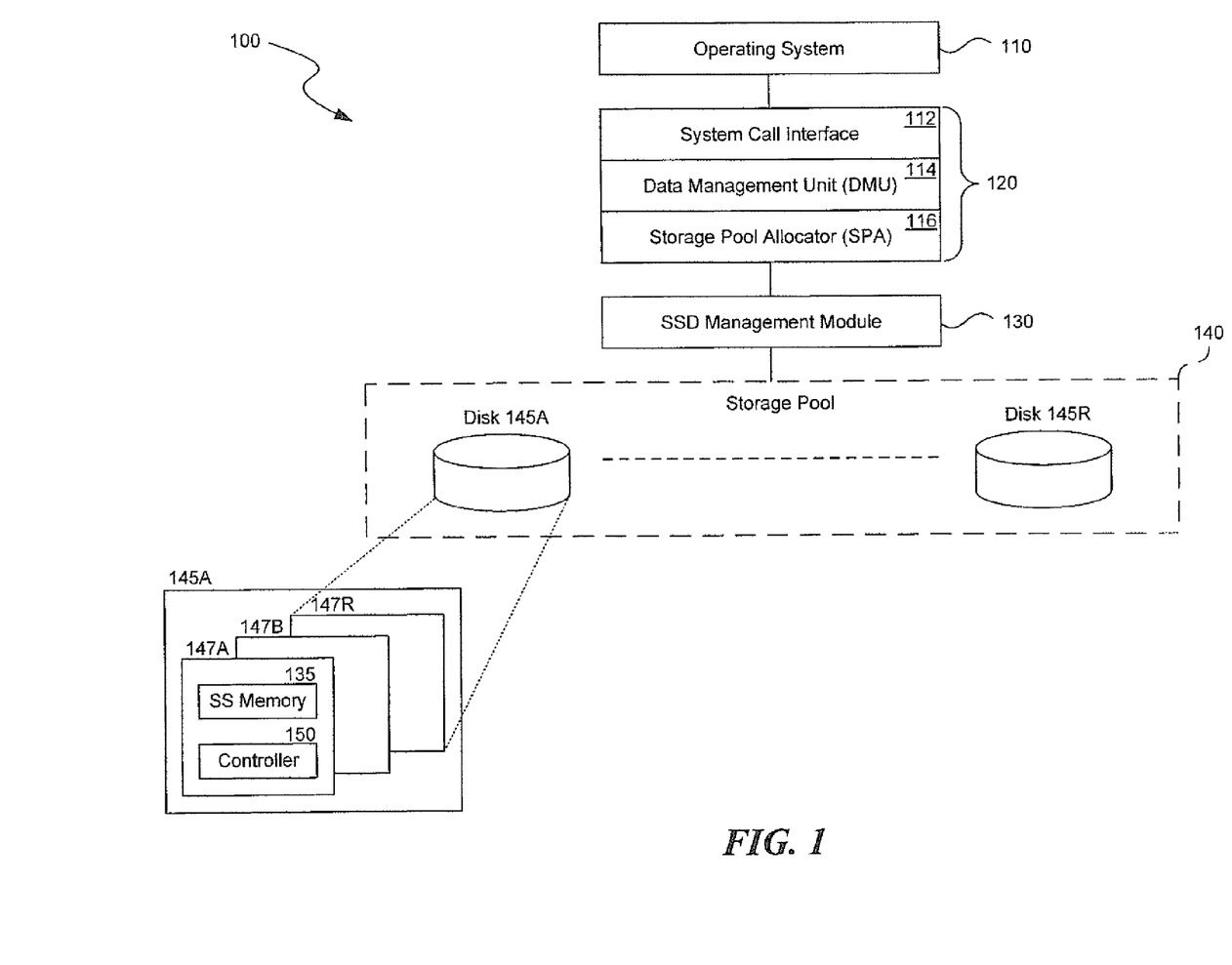
FIG. 1 is a block diagram illustrating a solid state device write operation management system.

FIG. 1 shows a SSD write operation management system ("the system") 100. The system includes an operating system 110, a file system 120, an SSD management module 130 ("the SSD module"), and a storage pool 140. The operating system interacts with the file system via a system call interface 112. File system 120 comprises the system call interface, a data management unit (DMU) 114, and a storage pool allocator (SPA) 116. The storage pool includes one or more physical disks 145A-R. Physical disk 145A is composed of an array of SSDs 147A-R.

The operating system initiates various operations—also called transactions—for accessing files within the file system. A non-exhaustive list of file operations includes reading, writing, opening, and closing data files and metadata. As used herein, the term metadata encompasses any data, other than user data, that facilitates the file system's organization of, access to, or other management of user data. The file system allocates persistent memory, tracks persistent memory usage, and otherwise manages the persistent memory of data storage devices, including the SSD array. As part of its function, the file system logically organizes user data stored in data files and metadata by associating virtual addresses with physical block addresses corresponding to each of the physical blocks (or other units) of user data and metadata under its management. A non-exhaustive list of examples of metadata includes directory information, file types, creation/access/modification times, and access control information. The file system also tracks free persistent memory space that is available, e.g., for new data files and metadata. A non-exhaustive list of examples of file systems includes Unix-based file systems (e.g., UFS, FFS), Linux-based file systems (e.g., XFS, JFS, ReiserFS, btrfs), Solaris-based file systems (e.g., VxFS, QFS, ZFS), Windows-based file systems (e.g., FAT, NTFS) and Mac OS-based file systems (e.g., HFS Plus). The file system also has access to status information of the SSD. A non-exhaustive list of examples includes garbage collection status, P/E counts of blocks, and the number of physical free blocks available.

The DMU is responsible for presenting an object model that is built from the address space presented by the SPA. An object is an arbitrary piece of storage from the SPA. More specifically, the DMU represents the objects as data blocks and indirect blocks as described in FIG. 3 below. The DMU includes functionality to send a series of operations to the SPA as a group (i.e., transaction group). The SPA is responsible for allocating blocks from all the devices in the storage pool. It presents itself as an interface to allocate and free virtually addressed blocks. It receives information from the DMU and subsequently writes blocks into the storage pool. The SPA also includes routines to create and destroy pools from their configuration information. This ability allows for dynamic addition and removal of storage devices from the storage pool without interrupting service. The SPA syncs the data out to the vdevs on regular intervals.

The SSD module incorporates both file system information and information related to the underlying physical solid-state storage media in order to perform actions that fulfill I/O requests originating from the file system. Additionally as described further herein, the SSD module performs various housekeeping operations to help improve the performance of the SSD array, such as wear-leveling and garbage collection operations.

The physical disks include one or more SSDs which comprise an SSD array. Physical disks may be dynamically added or removed from the storage pool in order to increase or decrease storage space. Each SSD includes persistent solid-state memory 135 and a controller 150 that is configured to execute firmware (not shown) to store, retrieve and erase data. In some embodiments, the controller and firmware are configured differently from many conventional systems in that they do not perform onboard garbage collection or wear-leveling, but rely upon the SSD module to manage such operation, as described in greater detail herein. In various embodiments the SSDs in the SSD array are configured as a Redundant Array of Independent Disks ("RAID") group, data mirror, or other type of drive array configuration that provides data redundancy and protection. Although only a single SSD array is shown, in some embodiments the same SSD module manages multiple SSD arrays. Unless the context requires otherwise, subsequent references to "the controller" should be understood to encompass both the controller and the firmware and/or software executed by the controller. As used herein, "solid-state memory" encompasses, as non-exhaustive examples, flash memory, magnetoresistive random access memory ("MRAM"), phase-change memory (i.e., PCM, PRAM, PCRAM, Ovonic Unified Memory, Chalcogenide RAM, or C-RAM), ferroelectric random access memory ("FeRAM" or "FRAM"), conductive-bridging RAM or programmable metallization cell memory, Silicon-Oxide-Nitride-Oxide-Silicon ("SONOS") memory, resistive random access memory ("RRAM"), Racetrack Memory, Nano-RAM ("NRAM"), Millipede memory, dynamic random access memory ("DRAM"), static random access memory ("SRAM"), thyristor random access memory ("T-RAM"), zero capacitor random access memory ("Z-RAM"), and twin transistor random access memory ("TTRAM").

SPA Organization

Figure 2:
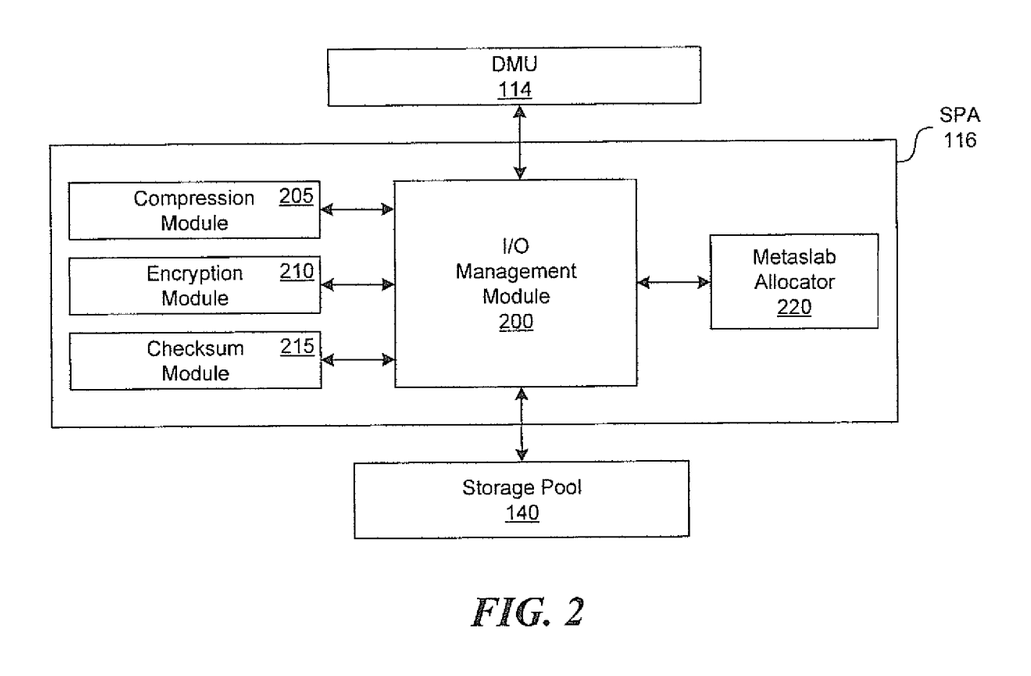
FIG. 2 is a block diagram illustrating a storage pool allocator.

FIG. 2 shows the SPA in more detail. The SPA includes an I/O management module 200, a compression module 205, an encryption module 210, a checksum module 215, and a metaslab allocator 220.

As noted above, the SPA receives transactions from the DMU. More specifically, the I/O management module within the SPA receives transactions from the DMU and groups the transactions into transaction groups. The compression module provides functionality to compress larger logical blocks (i.e., data and indirect blocks, see discussion below) into smaller segments. For example, a logical block size of 8 k bytes may be compressed to a size of 2 k bytes for more efficient storage. The encryption module provides various data encryption algorithm which may be used to prevent unauthorized access. The checksum module creates checksums for data and metadata. The file system uses these checksums to check the integrity of the data by recomputing the checksum and comparing it with a stored one.

The SPA uses the metaslab allocator to manage the allocation of storage space in the storage pool. The metaslab allocator first chooses one or more devices in the storage pool for data allocation. In some embodiments, the metaslab allocator uses a data striping technique to choose devices for data allocation. This technique segments logically sequential data in a way that makes allocations of sequential logical segments to different physical storage devices in the storage pool. By performing segment allocations on multiple devices, multiple segments can be accessed concurrently by the file system thereby increasing bandwidth. One method for performing data striping is by allocating data to the drives in a round-robin fashion. In this method, the file system allocates a portion of the data to one device and then writes data to the next device once a predetermined amount of data has been written to the first device. The granularity of data written to each device may be changed depending on many factors including transfer rate and the number of I/O requests desired. In some file systems, the granularity may be 512 kb of data. In some embodiments, data striping is performed on an eight-member SSD array where the write request is split into six smaller write requests that each include a portion of the source data, and two write requests that each include parity data. These portions of the source data are then written to the SSD array in round-robin fashion. Data striping may be performed in a variety of different ways including spreading the data across multiple arrays (wide striping), or spreading the data across the drives contained within a single array (narrow striping).

As explained above, the vdevs in the storage pool are divided into contiguous regions of data called metaslabs. The metaslabs may in turn be divided into segments which can be of varying sizes. The metaslab allocator allocates segments within the metaslabs based on the size of the blocks within the write request. In other words, small segments are allocated for small blocks while large segments are allocated for large blocks. The allocation of segments based on block size allows for more efficient storage of data and metadata in the storage pool by reducing the amount of unused space within a given metaslab. Additionally, using large segments for large blocks allow for more efficient access to data by reducing the number of I/O operations.

Block Pointer Organization

Figure 3:
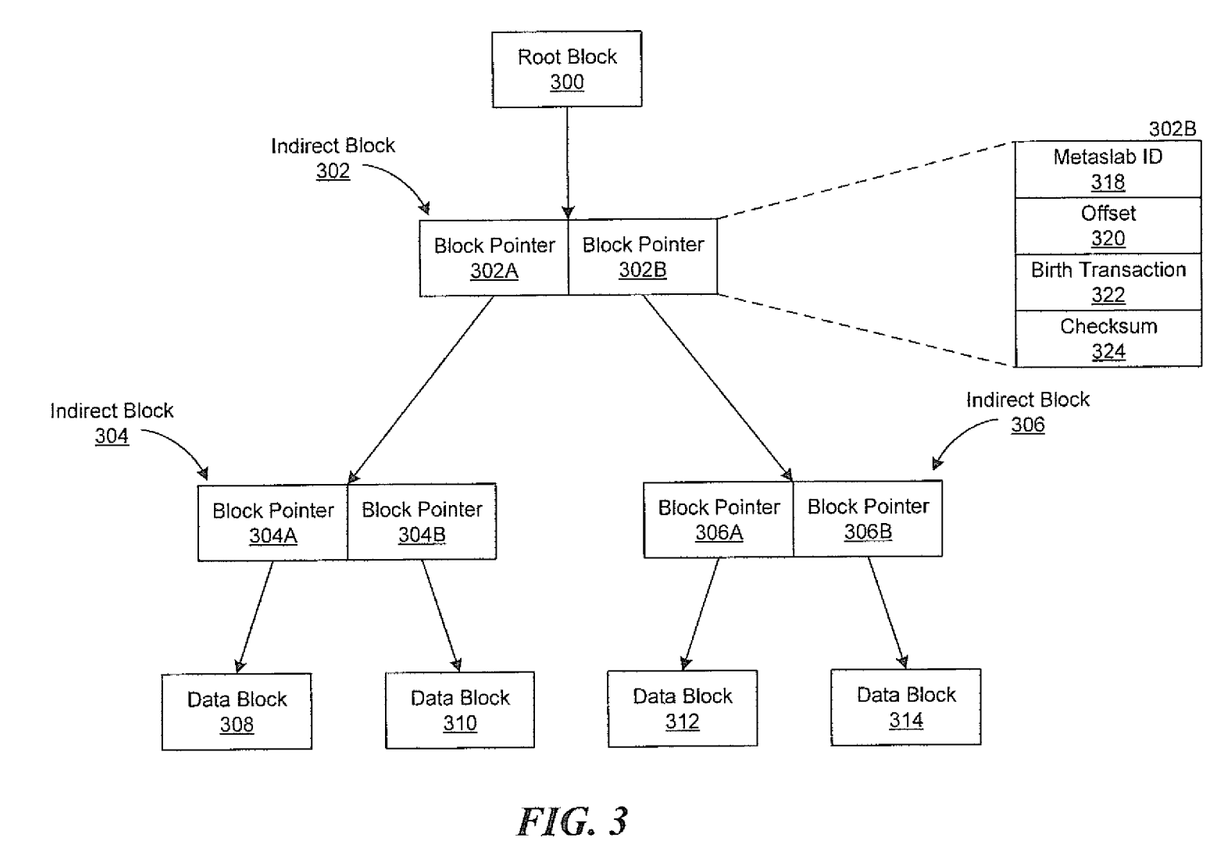
FIG. 3 is a block diagram illustrating a hierarchical data configuration.

FIG. 3 shows a hierarchical data configuration (herein "tree") for storing data blocks and indirect blocks within the storage pool. The tree includes a root block 300, one or more levels of indirect blocks 302, 304, and 306), and one or more data blocks (308, 310, 312, and 314). One skilled in the art will appreciate that several layers of indirect blocks may exist between the root block and the data blocks. The root and indirect blocks are an array of one or more block pointers that, directly or indirectly, reference to the data blocks. The data blocks contain actual data that is stored in the storage pool.

The root block and each indirect block include attribute data as shown in the expanded block pointer 302B. Each block pointer includes a metaslab ID 318, an offset 320, a birth transaction 322, and a checksum 324 of the data stored in the block (data block or indirect block) referenced by the block pointer. The metaslab ID and offset are used to determine the location of the block (data block or indirect block) in the storage pool. The metaslab ID identifies the particular disk and/or virtual device with which the metaslab is linked. The offset is then used to reference a particular segment in the metaslab. The data within the segment referenced by the particular metaslab ID and offset may correspond to either a data block or an indirect block. If the data corresponds to an indirect block, then the metaslab ID and offset within the block pointer in the indirect block are used to locate a subsequent indirect block or data block. Whenever a write operation occurs, a data block is allocated and the data is written into the block. Since the indirect block must be written in order to record the new location of the data block, it must also be copied to a new block. Newly written indirect blocks "ripple" all the way up the tree to the root block.

Also within the block pointer is a birth transaction, which is information relating to when the file system allocated the data block or indirect block. File systems use the checksum value in order to ensure that the data has not been corrupted. In some embodiments, the file system supports multiple different algorithms for checksumming. The algorithm used to checksum this block is identified within the block pointer.

Storage Pool Organization

Figure 4:
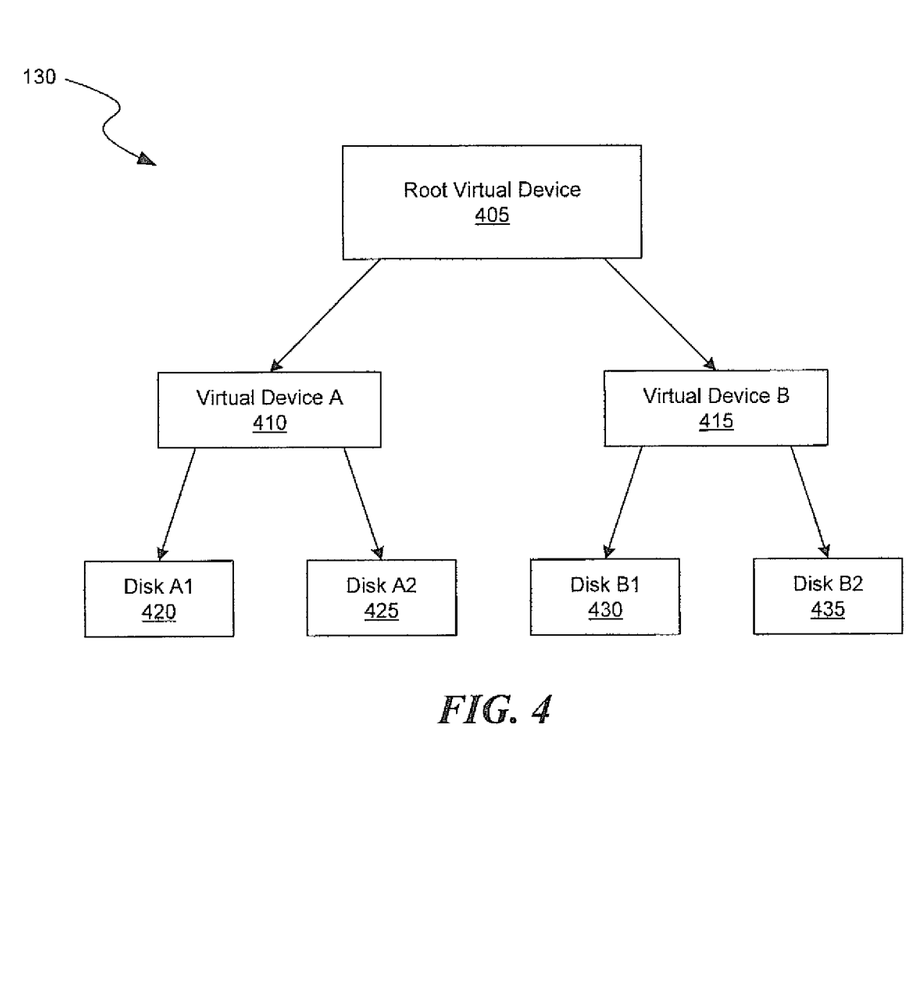
FIG. 4 is a block diagram of a storage pool.

FIG. 4 shows a diagram of a storage pool 130. As noted above, the storage pool contains one or more physical disks. The file system abstracts the physical structure underlying the disks and the file system may view the disks as a monolithic virtual device or multiple virtual devices having an aggregate capacity. Each vdev identifies the available space as well as associating itself to blocks on the physical disks. A vdev has one or more children, which may be other vdevs or physical disks. In FIG. 4, disks A1 and A2 (420 and 425) are grouped with virtual device A (410), while disks B1 and B2 (430 and 435) are grouped with virtual device B (415). While FIG. 4 shows two vdevs with each of them having two underlying physical disks, any other arrangement of vdevs and/or physical disks may be used.

The vdevs are configured into a virtual device tree. The storage pool includes a root virtual device 405 serving as a root of the vdev tree. While the root vdev illustrated in FIG. 4 has only two immediate children (vdevs A and B), the root vdev may have any number of children as permitted by the file system. Moreover, the vdev tree may include any number of levels of vdevs which may also lead to an imbalance of the tree. In other words, one branch of the tree may have more levels than another branch, and/or may include more vdevs than another branch.

SSD Array Organization

Figure 5:
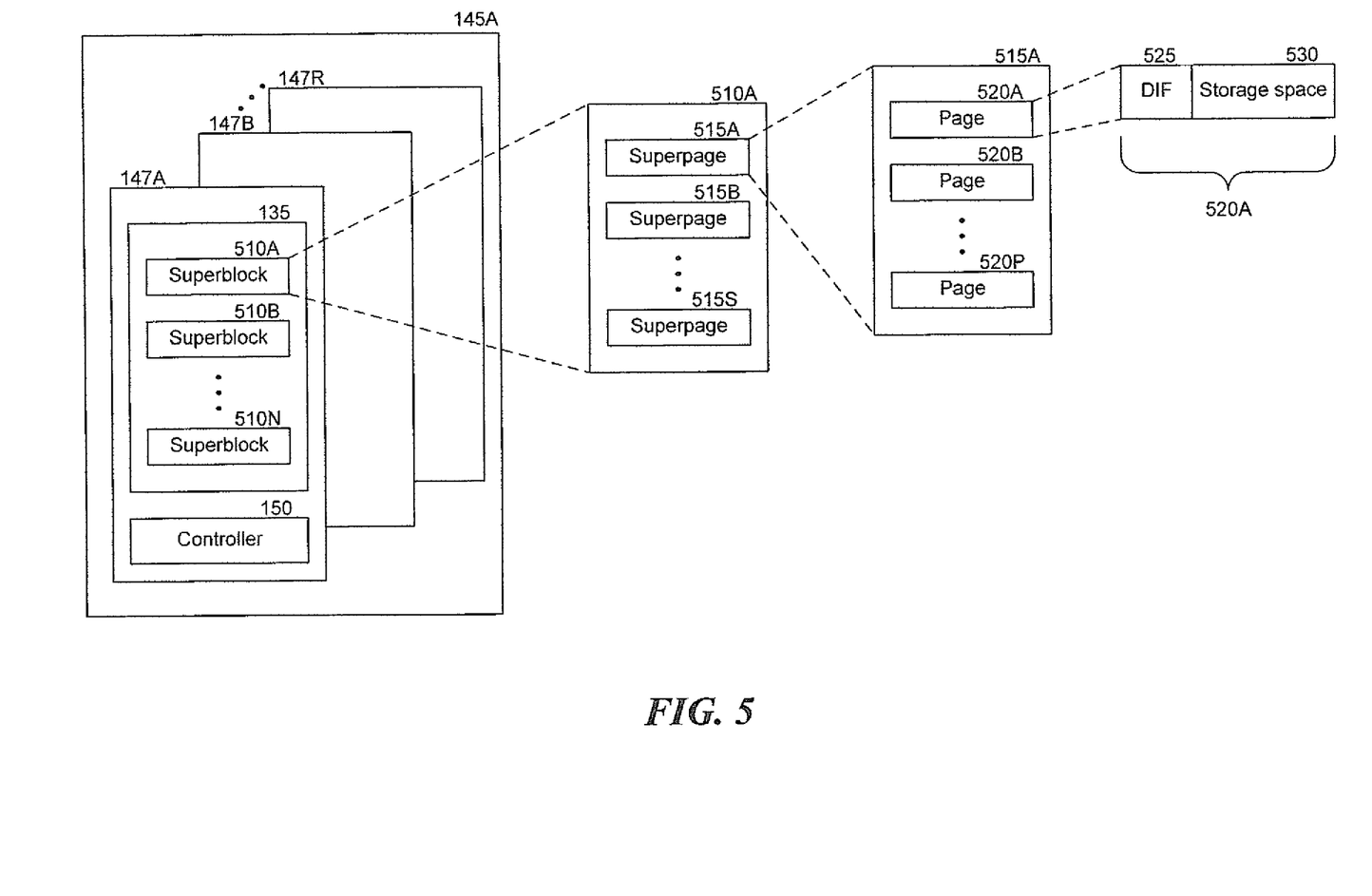
FIG. 5 is a block diagram illustrating the hierarchical organization of an SSD array.

FIG. 5 illustrates the hierarchical organization of an SSD array 145A. As shown, the solid-state memories 147A-R of each SSD in the SSD array comprises one or more superblocks 510, each of which in turn comprises one or more superpages 515, each of which in turn comprises one or more pages 520. In some embodiments, an SSD has a capacity of approximately 512 GB, a superblock stores approximately 128 MB of data, a superpage stores approximately 64 KB of data, and a page stores approximately 8 KB of data.

Each superblock is a grouping of one or more flash blocks that the controller associates with a unique superblock address; the constituent flash blocks in a superblock are typically physically contiguous. Typically, the controller permits erasures (or "flashes") to occur only at the superblock-level, and does not permit erasures at the level of a superblock's constituent individual physical flash blocks. Each superpage is a physically contiguous grouping of one or more flash pages that the controller associates with a unique combination of a superblock address and a superpage address. Each page is a physically contiguous collection of memory cells in the solid-state memory that the controller associates with a unique combination of a superblock address, a superpage address, and a page address. Typically, the controller permits programming to occur only at the page-level. The controller typically does not permit random-access programming at the level of a page's constituent memory cells.

Generally speaking, within a particular superblock, the controller will implement only sequential write operations. In other words, the controller will spread the first write operation to a superblock along the first set of contiguous pages in a first superpage and begin the next, second write operation to the same superblock at the next contiguous page in the first superpage. Once the first superpage in the superblock is full, during the next write operation to the same superblock, the controller will write data to the first page in the next physically contiguous superpage.

As shown in FIG. 5, each page includes storage space 530 and a data integrity field ("DIF") header region 525. The storage space 530 is a collection of memory cells (e.g., 8 KB) within the page used to store user data, metadata, or raw data (e.g., data structures utilized by the SSD module as described in greater detail herein). The DIF header region is a smaller collection of memory cells (e.g., 16 bytes) that are conventionally used to store data integrity information. For example, the DIF header region may be used to store checksums or similar information that permits the controller to determine whether the data in the storage space is corrupt. In some embodiments, the SSD controller accepts at least two kinds of write requests: (1) a "with DIF" write request to write both source data (e.g., user, metadata, or raw) into the storage space and to write other data (e.g., restoration data) to a portion of the DIF header, and (2) a "without DIF" write request to only write source data into the storage space.

Garbage Collection and Wear Leveling

Generally speaking, garbage collection (herein "GC") is a process whereby the SSD frees up invalid pages that store data that is no longer needed by the file system (i.e., stale data), in order to make those pages available for new write operations. This process may be initiated by either the SSD controller or by the file system. The need for GC arises from the SSDs' different write and erase granularities; that is, data can be written to memory at the page level, but data can only be erased at the superblock level. For example, if a superblock has been written to on a number of occasions, it may have a combination of stale and valid data. Even when the superblock reaches the point of containing mostly stale data, that stale data cannot be overwritten until the whole superblock block is erased. In order to write to the pages with stale data, all valid pages in the superblock are read and written to a new superblock. Then the old superblock is erased. In some embodiments, GC is accompanied with a defragmentation process. For example, when valid pages are written to a new superblock during GC, the file system or SSD controller will write the pages such that free space between the regions of valid data are minimized or eliminated. In various embodiments, various conditions can trigger the file system to perform GC. For example, in some embodiments the file system initiates GC on a drive in response to determining the ratio of the space of empty erased superblocks to the sum of the current free space and stale data on the drive falls below a certain threshold. Also, in some embodiments, the file system stops or prevents GC from running if there is not a certain amount of stale data in the superblock that can be overwritten during GC, as running GC under these conditions would be an inefficient use of file system resources. Additionally, in some embodiments, if there is a large amount of data that is to be written to the storage pool, the file system suspends GC on a particular drive until the data is written. In various embodiments, the file system uses these and other parameters separately or in conjunction with one another during a GC process. In addition, in some embodiments, the file system uses these and other parameters to determine whether GC will continue once GC has begun.

Generally speaking, wear leveling is a process that helps ensure that the various superblocks in the SSD have similar wear counts. By implementing wear leveling, the longevity of the SSD may be increased. This process may be initiated by either the SSD controller or by the file system. There are two types of SSD wear leveling: dynamic and static. Dynamic wear leveling pools erased superblocks and selects the block with the lowest P/E count for the next write. Static wear leveling selects the target block with the lowest overall P/E count, erases the block if necessary, writes new data to the block, and ensures that blocks of static data are moved when their block P/E count is below a certain threshold. In some embodiments, the file system also performs certain wear leveling procedures. On occasion, data may be characterized as "hot" or "cold" data. Hot data is data that is written frequently. Cold data is data that is not written often. For example, metadata is often considered hot data while user data is considered cold data. Since hot data produces higher wear counts on a superblock containing it, the file system may move the hot data to another vdev in order to prevent the wear counts of the original vdev's associated superblock from increasing too quickly.

In some examples, the file system combines both a GC process in conjunction with a wear leveling process into a single thread that may be triggered periodically, e.g., every 30 seconds, or upon the occurrence of another condition. Additionally, in some embodiments, to facilitate faster garbage collection and/or wear leveling processes, the file system maintains an over-provisioning pool of free superblocks (e.g., 128 superblocks) to use during maintenance operations. Utilizing multiple vdevs allows the file system to have access to more storage on the drives because GC may be utilized on some drives while the file system is performing write operations on other drives. To further enhance maintenance performance, the file system may maintain, in its memory and/or the solid-state memory, several lists of superblocks that have (a) the highest P/E counts (e.g., a list of 64 superblocks), (b) the lowest P/E counts (e.g., a list of 64 superblocks), and/or (c) the highest number of invalid pages (e.g., a list of 64 superblocks).

Vdev Status

Figure 6:
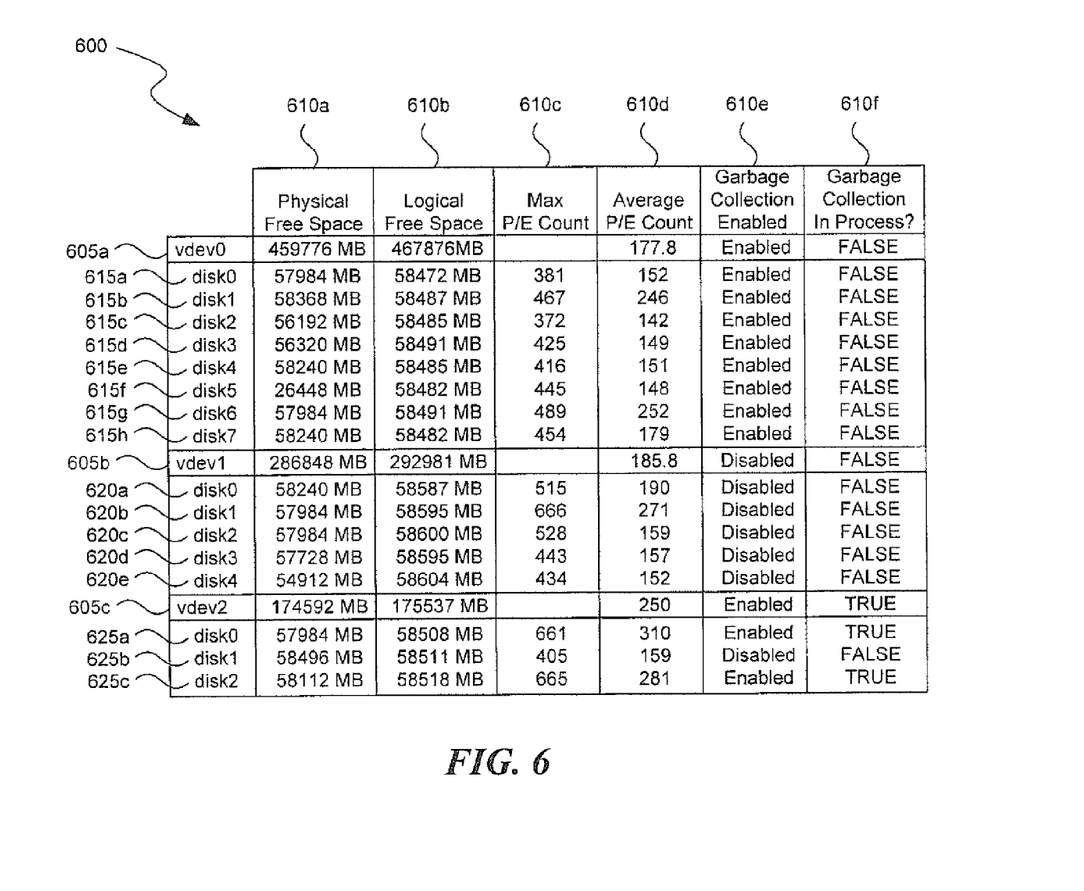
FIG. 6 is a table illustrating vdevs and their status.

FIG. 6 is a table illustrating multiple vdevs and their respective statuses that the file system uses to facilitate its various functions. FIG. 6 includes a vdev status table 600, vdevs contained within the storage pool 605a-c, and various status columns 610a-f. As shown, the table shows disks 615a-h, 620a-e, and 625a-c that are associated with vdevs 605a, 605b, and 605c, respectively. The naming conventions used for the vdevs and the disks shown in FIG. 6 are arbitrary and any naming convention may be used. In addition, a vdev may have more or less status statistics that a file system may utilize. A non-exhaustive list of these statistics includes number of non-operational superblocks, fail conditions, read and write bandwidth, and number or read and write operations.

Items 605a-c depict three different vdevs contained within the storage pool. Vdev 605a has eight disks associated with it (615a-h), vdev 605b has five disks associated with it (620a-e), and vdev 605c has three disks associated with it (625a-c). A vdev may have various numbers of disks associated with it. Some file systems require a minimum number of disks associated with a vdev. For example, a RAID-Z configuration requires a minimum of three disks: one disk for data and two disks for parity.

Column 610a indicates the physical free space contained within a particular vdev and disk. The sum of the physical free space of the disks associated with a vdev is approximately the physical free space of the vdev. Column 610b indicates the logical free space associated with a particular vdev and disk. The sum of the logical free space of the disks associated with a vdev is approximately the logical free space of the vdev. The difference between a physical free space value and its corresponding logical free space value is data used for header information and an amount of stale data contained within a disk.

Column 610c indicates the P/E count of the superblock with the greatest P/E count contained within the vdev. The file system has access to all the P/E counts of the superblocks contained within a disk. Column 610d indicates an average P/E count for a particular vdev or disk. To illustrate, the average P/E count of disk 615a is 152. This indicates the average of all the P/E counts of the superblocks contained within the disk. In addition, the average P/E count of vdev 605a is 177.8. This is the average P/E count of all the disks associated with the vdev. If there is a disk associated with a vdev that is inoperable, then the P/E count of the inoperable disk may be removed from the average P/E count calculation for the vdev.

Column 610e indicates whether the file system has enabled a GC process for a vdev or disk. In some embodiments, enabling a GC process involves setting a garbage collection flag and initiating a garbage collection timer. The file system may enable and disable GC for both a vdev and its associated disks. For example, GC for vdev 605a has been enabled and as a result its associated disks 615a-h have GC enabled. The opposite is true for vdev 605b—the file system has disabled GC for this vdev and as a result its associated disks 620a-e have GC disabled. For vdev 605c, the file system has enabled GC, however, the file system has also disabled GC for disk 620b. Column 610f indicates whether a particular vdev or disk is currently undergoing GC. Vdev 605a and its respective disks are not currently undergoing GC despite the fact that the file system has enabled GC. GC for vdev 605c is enabled and disks 625a and 625c are currently undergoing GC. If a vdev is scheduled to undergo or is currently undergoing GC, the system will not typically select this vdev for data allocation. In certain circumstances, however, the system will suspend a vdev's scheduled or ongoing GC operation. For example, in order to perform a write operation the file system may suspend GC on one of the vdevs in the storage pool if all the vdevs in the storage pool are currently performing GC.

Write Operation

Figure 7:
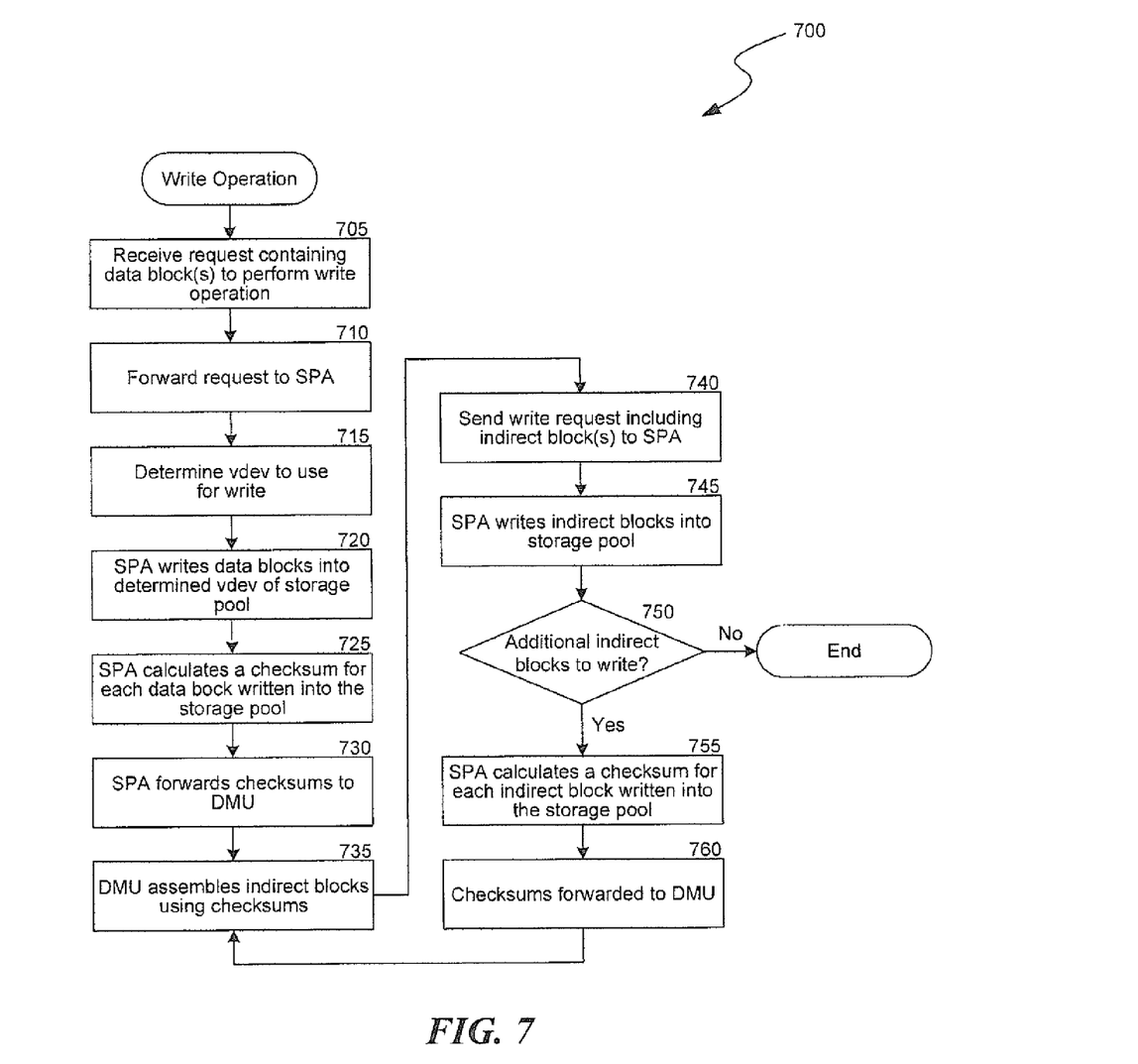
FIG. 7 is a flowchart illustrating a process for a write operation.

FIG. 7 is a flowchart illustrating a process 700 for a write operation. The write operation process begins at block 705 where the DMU receives a write request from an application, the operating system, etc. In some examples, a write operation is initiated from the SSD module itself, not in response to an explicit request to perform a write operation. For example, the SSD module may initiate a write operation as part of an SSD maintenance operation (e.g., garbage collection or wear leveling). The write request includes one or more data blocks, and/or one or more indirect blocks. Thus, for a given write request, the first write request includes the data blocks to be written to disk. Subsequent requests may include the corresponding indirect blocks containing one or more block pointers.

At block 710 the write request is forwarded to the SPA. In some embodiments, the write request is forwarded to the SPA along with one or more earlier-received related requests. Next, utilizing the method that is described further in connection with FIGS. 8-10, the file system chooses the vdev to write to at block 715. Upon receiving the data blocks form the DMU, the SPA writes the data blocks into the storage pool in block 720. In block 725, the checksum module in the SPA calculates a checksum for each data block written into the storage pool. Checksums for a data block are stored in the parent blocks (i.e., root or indirect block that reference the data block), and the parents are checksummed themselves. The SPA then forwards the checksums to the DMU in block 730. At block 735, the DMU assembles the indirect blocks with the calculated checksums. The DMU places the calculated checksum for a given data block in the appropriate block pointer in the indirect block. Next, the indirect blocks are forwarded to the SPA in block 740. Those skilled in the art will appreciate that the aforementioned indirect blocks correspond to the indirect blocks that directly point (via the block pointers) to the data blocks, as opposed to indirect blocks that point to other indirect blocks.

At block 745, the SPA receives and subsequently writes the indirect blocks containing the checksums into the storage pool. A block's checksum is stared in its parent indirect block. The checksum for the root block of the tree is stored in the root block. At decision block 750, a determination is made whether additional indirect blocks exist to write into the storage pool. If no additional indirect blocks exist then the write operation is complete. However, if additional indirect blocks exist, then the SPA calculates the checksum from each of the indirect blocks written into the storage pool at block 755. Then at block 760 the checksums for each of the indirect blocks is subsequently forwarded to the DMU. Blocks 735 through 760 are repeated until the root block is written into the storage pool.

Solid State Device Write Operation Management System

Figure 8:
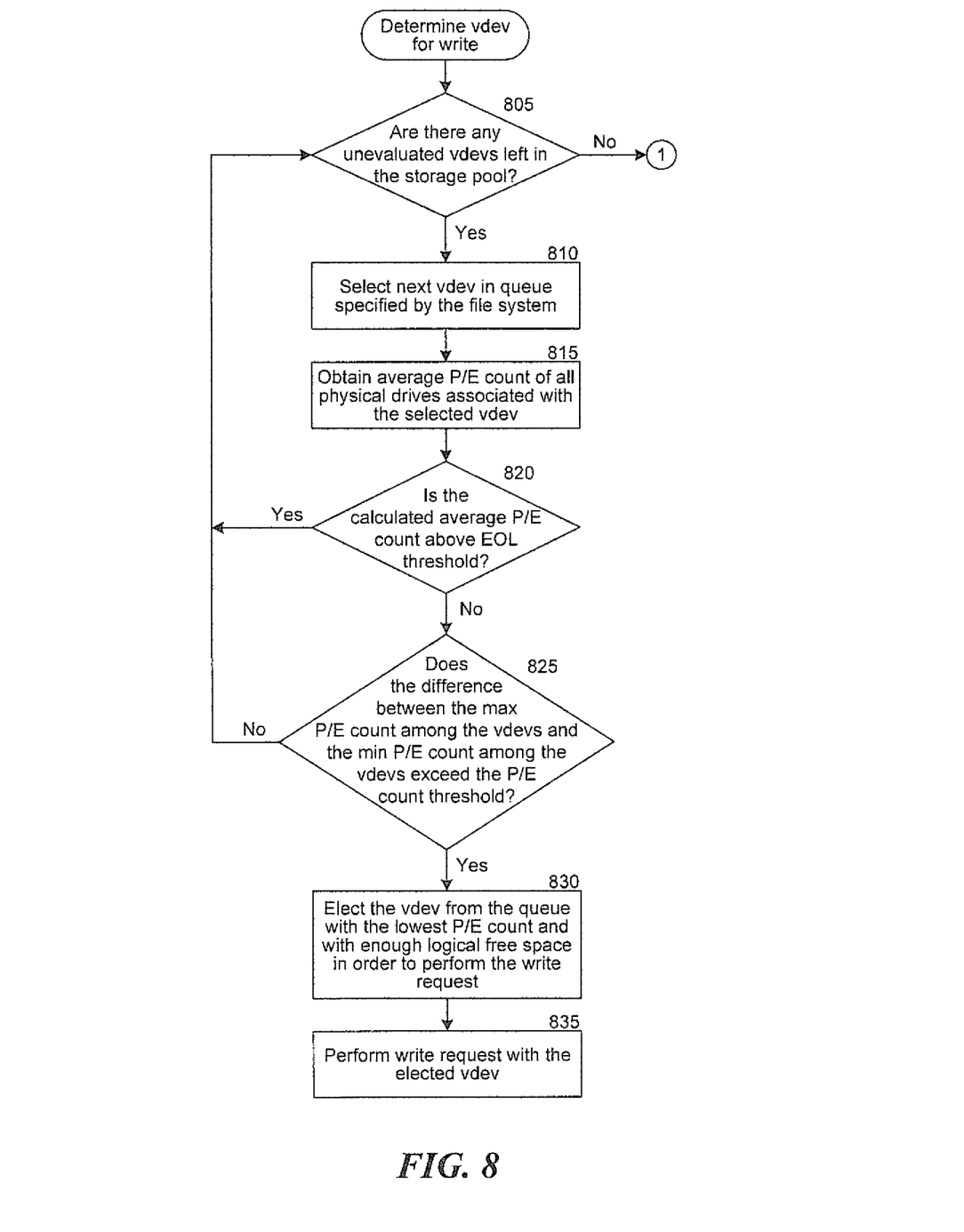
FIG. 8-10 are flow charts illustrating a method for determining a vdev for a write operation.
Figure 9:
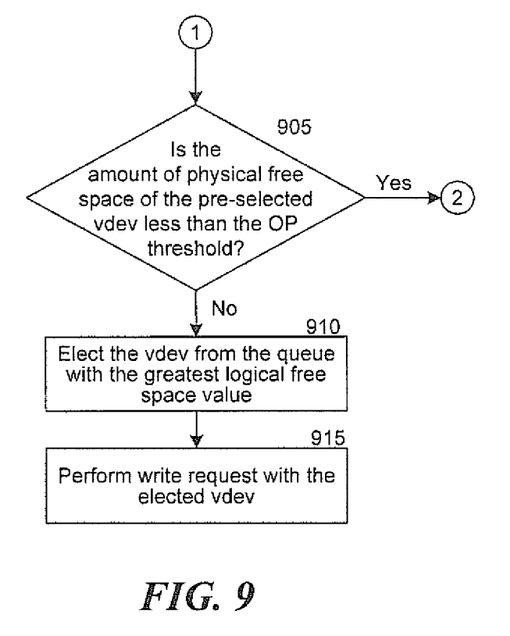
Figure 10:
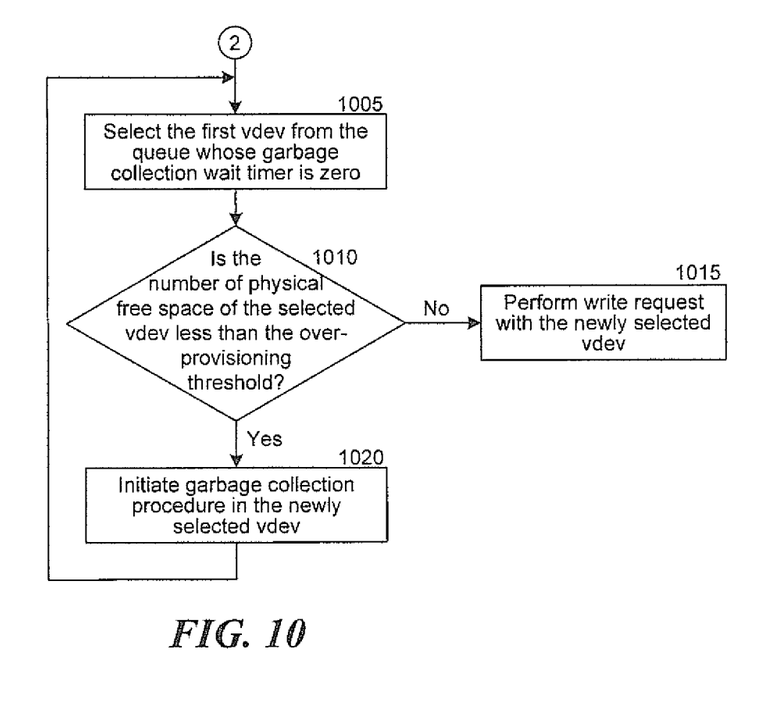

FIGS. 8-10 are flowcharts showing steps typically performed by the system to determine a vdev at block 715 that will be used to perform a write operation requested at block 705. The steps begin with block 805. In step 805, the system determines if there are any vdevs in the storage pool that have not been previously evaluated by the system. If all the vdevs in the storage pool have been evaluated by the loop shown in blocks 810-825, then the system proceeds to FIG. 9. If there are any unevaluated vdevs remaining, the system proceeds to block 810. At block 810 the system selects a vdev to evaluate from an ordered queue of vdevs. The queue is constructed by the file system and is ordered according to when a vdev is created, with the earliest created vdev first in the queue.

At block 815 the system obtains an average P/E count of all the physical drives associated with the selected vdev. This value may be found in column 610d of FIG. 6. After block 815, the system proceeds to block 820. Block 820 is a decision block in which the system determines if the average P/E count of the selected vdev is above a predetermined End of Life (EOL) threshold. As explained above, SSD memory is currently limited by the fact that it has a finite number of program/erase cycles before its memory cells become unreliable (i.e., reaches EOL). Here the EOL threshold is predetermined based on a number of factors including the P/E count rating for the particular SSD. If the average P/E count of the selected vdev is above the EOL threshold then the system reverts back to block 805. If the average P/E count of the selected vdev is below or equal to the EOL threshold then the system proceeds to block 825.

Block 825 is a decision block that determines if the difference between the maximum P/E count among the vdevs and the minimum P/E count among the vdevs exceed the P/E count threshold. In various embodiments, the P/E count values used for this calculation is the total P/E count of the vdev (the total of all the P/E counts of all the superblocks associated with the vdev), or the average P/E count of the vdev. The P/E count threshold is an arbitrary value that can be either an absolute number of P/E counts or a percentage. Theoretically the P/E counts of the vdevs should be relatively close to each other due to wear leveling procedures. However, this may not be the case if a new device with relatively low P/E counts has been added to the storage pool or if wear leveling efforts have failed. If the calculated difference between the maximum P/E count among the vdevs and the minimum P/E count among the vdevs do not exceed the P/E count threshold then the system reverts back to block 805. If the calculated difference between the maximum P/E count among the vdevs and the minimum P/E count among the vdevs IS greater than or equal to the P/E count threshold then the system proceeds to block 830.

At block 830 the system elects the vdev from the queue that possesses the lowest P/E count and also possesses enough logical free space in order to perform the write request. This value may be found in column 610b of FIG. 6. Once the system determines a vdev that meets these qualifications the write operation is performed on the elected vdev in block 835.

The steps of FIG. 9 are invoked if all the vdevs in the storage pool are below the EOL threshold and if the difference between the maximum P/E count among the vdevs and the minimum P/E count among the vdevs do not exceed the P/E count threshold. At decision block 905, the system determines whether the amount of physical free space of the most recently selected vdev from the queue is less than the over-provisioning threshold. The amount of physical free space may be found in column 610a of FIG. 6. As explained above, the OP threshold specifies an amount of space by which the physical capacity of the SSD should exceed the logical capacity presented through the system as available to the user. The OP threshold is an arbitrarily determined value which represents an absolute amount of space. For example, the OP threshold may be 36 GB. If the amount of physical free space of the selected vdev is less than the OP threshold, then the system proceeds to FIG. 10. Additionally, this selected vdev is then set for garbage collection. When the system initiates a GC procedure on a particular vdev, the GC procedure is applied to all the drives associated with the vdev. This vdev is then flagged as having an active GC procedure and a GC wait timer is started. The GC wait timer is an arbitrary length of time (for example, eight seconds). When the GC wait timer has reached zero then the system has the ability to reset the GC flag which ends the GC process on the vdev.

If the amount of physical free space of the selected vdev is greater than or equal to the OP threshold then the system proceeds to block 910. At block 910 the system elects the vdev from the queue with the greatest logical free space value and performs the write operation on the elected vdev.

When the system invokes the steps of FIG. 10, at box 1005 the system selects the first vdev from the queue whose GC wait timer is zero. If the first vdev whose GC wait timer is zero still has an active GC flag (indicating that it recently underwent a GC procedure), the system will reset the GC flag. The system then proceeds to decision block 1010 where the system determines whether the amount of physical free space of the newly selected vdev from the queue is less than the OP threshold. If the amount of physical free space of the newly selected vdev is less than the OP threshold, then the system initiates a GC procedure on this vdev and reverts back to block 1005. If the amount of physical free space of the newly selected vdev is greater than or equal to the OP threshold, then the system performs the write operation on this vdev.

Computer Systems and Other Devices

Figure 11:
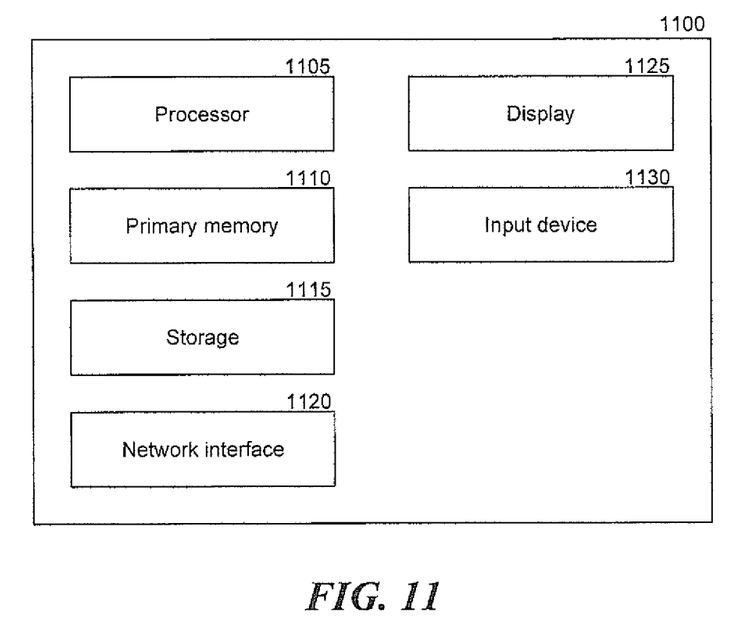
FIG. 11 is a block diagram illustrating an example of a suitable computing environment in which the facility may operate in some embodiments.

FIG. 11 is a block diagram showing some of the components typically incorporated in at least some of the computer systems and other devices on which the method executes. In various embodiments, these computer systems and other devices 1000 can include server computer systems, desktop computer systems, laptop computer systems, data storage appliances, tablets, netbooks, mobile phones, personal digital assistants, televisions, digital video recorders, set top boxes, cameras, automobile computers, electronic media players, etc. In various embodiments, these computer systems and devices 1100 may include, but are not limited to, a central processing unit ("processor") 1105; primary memory 1110, a storage unit 1115, a network interface or adapter 1120, a display 1125, and an input device 1130.

The processor is used for executing computer instructions while the primary memory is used for storing programs and data while they are being used, including the SSD module and associated data. The storage device comprises a persistent storage device, such as a hard drive for persistently storing programs and data. The storage device may also include a variety of computer-readable media that are operable with the storage device. The computer system may operate in a networked environment using the network interface. A logical connection to one or more remote computers can be made via a local area network (LAN) or a wide area network (WAN), but may also be made via other networks. A remote computer may be a personal computer, a server, a router, a network PC, a peer device, or other common network node. The input device consists of any device that receives various inputs into the computing system. A non-exhaustive list of examples includes a keyboard, mice, microphones, webcams, and touchscreens.

The computer system 1100 is only one example of a suitable computing environment and is not intended to suggest any limitation as to the scope of use or functionality of the facility. Neither should the computing system environment be interpreted as having any dependency or requirement relating to any one or a combination of the illustrated components. For example, the processor may execute computer instructions in a storage appliance that is not connected by a bus or other subsystem to any of the other components described above.

Those skilled in the art will appreciate that the logic illustrated in the flow diagrams and described above may be altered in a variety of ways. For example, the order may be rearranged, some steps may be performed in parallel, shown logic may be omitted, or other logic may be included, etc. In various embodiments, the functionality provided by the facility can be adapted in such a way that alternate components provide portions of the described logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for processing a write operation for a solid-state drive (SSD) having solid-state memory, the method comprising:
   determining one or more vdevs that have not exceeded an End of Life threshold, wherein the one or more vdevs that have not exceeded an End of Life threshold comprise a queue of vdevs;
   determining a Program/Erase (P/E) count and an average physical free space for each vdev from the queue of vdevs;
   identifying among the P/E counts a maximum P/E count and a minimum P/E count;
   determining a difference in value between the maximum P/E count and minimum P/E count;
   where the determined difference is greater than a P/E count threshold and the vdev with the minimum P/E count possesses sufficient logical free space for the write operation,
      performing the write operation on the vdev from the queue of vdevs with the minimum P/E count; and
   where the determined difference is less than or equal to the P/E count threshold,
      selecting a vdev from the beginning of the queue of vdevs;
      where the average physical free space of the selected vdev is below an over-provisioning threshold,
         (a) electing the first available vdev from the queue that possesses a garbage collection wait timer whose value is zero,
         (b) where the average physical free space of the elected vdev is below the over-provisioning threshold,
            initiating a garbage collection procedure on the elected logical device,
         (c) where the average physical free space of the elected vdev is above the over-provisioning threshold,
            performing the write operation on the elected vdev, and
         repeating (a), (b), and (c) until an elected vdev is above the over-provisioning threshold.

2. The method of claim 1, wherein determining one or more vdevs that have not exceeded an End of Life threshold comprises:
   determining a P/E count of each active physical drive associated with a vdev;
   determining an average of the P/E counts of each active physical drive associated with the vdev; and
   where the average of the P/E counts of the vdev is less than the End of Life threshold,
      inserting the vdev into the queue of vdevs.

3. The method of claim 1, wherein initiating the garbage collection procedure comprises:
   toggling a garbage collection flag; and
   initiating a garbage collection wait timer set to a predetermined amount of time.

4. The method of claim 1, wherein the garbage collection procedure is suspended until the write operation is completed.

5. The method of claim 1, wherein the P/E count threshold is an absolute number of program/erase counts.

6. The method of claim 1, wherein the P/E count threshold is a percentage.

7. The method of claim 1, wherein the over-provisioning threshold is an absolute amount of space.

8. The method of claim 1, wherein the ratio of an absolute amount of space of empty erased superblocks to a sum of an absolute amount of current free space and stale data on a drive must be below a predetermined threshold before the garbage collection procedure is initiated.

9. A method for processing a write operation for a solid-state drive (SSD) having solid-state memory, the method comprising:
   determining one or more vdevs that have not exceeded an End of Life threshold, wherein the one or more vdevs that have not exceeded an End of Life threshold comprise a queue of vdevs;
   determining a Program/Erase (P/E) count, an average physical free space, and a logical free space value for each vdev from the queue of vdevs;
   identifying among the P/E counts a maximum P/E count and a minimum P/E count;
   determining a difference in value between the maximum P/E count and minimum P/E count;
   where the determined difference is greater than a P/E count threshold and the vdev with the minimum P/E count possesses sufficient logical free space for the write operation,
      performing the write operation on the vdev with the minimum P/E count;
   where the determined difference is less than or equal to the P/E count threshold,
      selecting a vdev from the beginning of the queue of vdevs;
      where the average physical free space of the selected vdev is greater than or equal to an over-provisioning threshold,
         performing the write operation on the vdev with the greatest logical free space value.

10. The method of claim 9, wherein determining one or more vdevs that have not exceeded an End of Life threshold comprises:
    determining a P/E count of each active physical drive associated with a vdev;
    determining an average of the P/E counts of each active physical drive associated with the vdev; and
    where the average of the P/E counts of the vdev is less than the End of Life threshold,
       inserting the vdev into the queue of vdevs.

11. The method of claim 9, wherein the P/E count threshold is an absolute number of program/erase counts.

12. The method of claim 9, wherein the P/E count threshold is a percentage.

13. The method of claim 9, wherein the over-provisioning threshold is an absolute amount of space.

14. A storage system comprising:
    solid-state memory configured to store data persistently;
    a controller, coupled to the solid-state memory, that is configured to execute a write operation to physical portions of the solid-state memory;
    a management module configured to:

receive a write request generated by a file system;
determine one or more vdevs that have not exceeded an End of Life threshold, wherein the one or more vdevs that have not exceeded an End of Life threshold comprise a queue of vdevs;
determine a Program/Erase (P/E) count and an average physical free space for each vdev from the queue of vdevs;
identify among the P/E counts a maximum P/E count and a minimum P/E count;
determine a difference in value between the maximum P/E count and minimum P/E count;
where the determined difference is greater than a P/E count threshold and the vdev with the minimum P/E count possesses sufficient logical free space for the write operation,
  perform the write operation on the vdev from the queue of vdevs with the minimum P/E count; and
where the determined difference is less than or equal to the P/E count threshold,
  select a vdev from the beginning of the queue of vdevs;
  where the average physical free space of the selected vdev is below an over-provisioning threshold,
    (a) elect the first available vdev from the queue that possesses a garbage collection wait timer whose value is zero,
    (b) where the average physical free space of the elected vdev is below the over-provisioning threshold,
      initiate a garbage collection procedure on the elected logical device,
    (c) where the average physical free space of the elected vdev is above the over-provisioning threshold,
      performing the write operation on the elected vdev, and
    repeat (a), (b), and (c) until an elected vdev is above the over-provisioning threshold.

15. The system of claim 14, wherein the file system is a ZFS file system.

16. The system of claim 14, wherein the solid-state memory is NAND flash memory.

17. The system of claim 14, wherein the solid-state memory is selected from the following: flash memory, magnetoresistive random access memory (MRAM), phase-change memory (i.e., PCM, PRAM, PCRAM, Ovonic Unified Memory, Chalcogenide RAM, or C-RAM), ferroelectric random access memory (FeRAM or FRAM), conductive-bridging RAM or programmable metallization cell memory, Silicon-Oxide-Nitride-Oxide-Silicon (SONOS) memory, resistive random access memory (RRAM), Racetrack Memory, Nano-RAM (NRAM), Millipede memory, dynamic random access memory (DRAM), static random access memory (SRAM), thyristor random access memory (T-RAM), zero capacitor random access memory (Z-RAM), and twin transistor random access memory (TTRAM).

18. The system of claim 14, wherein the management module is further configured to:
  determine a P/E count of each active physical drive associated with a vdev;
  determine an average of the P/E counts of each active physical drive associated with the vdev; and
  where the average of the P/E counts of the vdev is less than the End of Life threshold,
    insert the vdev into the queue of vdevs.

19. The system of claim 14, wherein the management module is further configured to:
  where the garbage collection procedure is initiated,
    toggle a garbage collection flag; and
    initiate a garbage collection wait timer set to a predetermined amount of time.

20. The system of claim 14, wherein a ratio of an absolute amount of space of empty erased superblocks to a sum of an absolute amount of current free space and stale data on a drive must be below a predetermined threshold before the garbage collection procedure is initiated.

21. A storage system comprising:
  solid-state memory configured to store data persistently;
  a controller, coupled to the solid-state memory, that is configured to execute a write operation to physical portions of the solid-state memory;
  a management module configured to:
    receive a write request generated by a file system;
    determine one or more vdevs that have not exceeded an End of Life threshold, wherein the one or more vdevs that have not exceeded an End of Life threshold comprise a queue of vdevs;
    determine a Program/Erase (NE) count and an average physical free space for each vdev from the queue of vdevs;
    identify among the P/E counts a maximum P/E count and a minimum P/E count;
    determine a difference in value between the maximum P/E count and minimum P/E count;
    where the determined difference is greater than a P/E count threshold and the vdev with the minimum P/E count possesses sufficient logical free space for the write operation,
      perform the write operation on the vdev from the queue of vdevs with the minimum P/E count; and
    where the determined difference is less than or equal to the P/E count threshold,
      select a vdev from the beginning of the queue of vdevs;
      where the average physical free space of the selected vdev is greater than or equal to an over-provisioning threshold,
        perform the write operation on the vdev with the greatest logical free space value.

22. The system of claim 21, wherein the file system is a ZFS file system.

23. The system of claim 21, wherein the solid-state memory is NAND flash memory.

24. The system of claim 21, wherein the solid-state memory is selected from the following: flash memory, magnetoresistive random access memory (MRAM), phase-change memory (i.e., PCM, PRAM, PCRAM, Ovonic Unified Memory, Chalcogenide RAM, or C-RAM), ferroelectric random access memory (FeRAM or FRAM), conductive-bridging RAM or programmable metallization cell memory, Silicon-Oxide-Nitride-Oxide-Silicon (SONOS) memory, resistive random access memory (RRAM), Racetrack Memory, Nano-RAM (NRAM), Millipede memory, dynamic random access memory (DRAM), static random access memory (SRAM), thyristor random access memory (T-RAM), zero capacitor random access memory (Z-RAM), and twin transistor random access memory (TTRAM).

25. The system of claim 21, wherein the management module is further configured to:
  determine a P/E count of each active physical drive associated with a vdev;

determine an average of the P/E counts of each active physical drive associated with the vdev; and where the average of the P/E counts of the vdev is less than the End of Life threshold, insert the vdev into the queue of vdevs.

26. The system of claim 21, wherein the management module is further configured to:

where the garbage collection procedure is initiated, toggle a garbage collection flag; and initiate a garbage collection wait timer set to a predetermined amount of time.

27. A computer readable medium storing computer readable instructions for machine execution of a method for processing a write operation for a solid-state drive (SSD) having solid-state memory, the method comprising:

determining one or more vdevs that have not exceeded an End of Life threshold, wherein the one or more vdevs that have not exceeded an End of Life threshold comprise a queue of vdevs;

determining a Program/Erase (P/E) count and an average physical free space for each vdev from the queue of vdevs;

identifying among the P/E counts a maximum P/E count and a minimum P/E count;

determining a difference in value between the maximum P/E count and minimum P/E count;

where the determined difference is greater than a P/E count threshold and the vdev with the minimum P/E count possesses sufficient logical free space for the write operation, performing the write operation on the vdev from the queue of vdevs with the minimum P/E count; and where the determined difference is less than or equal to the P/E count threshold, selecting a vdev from the beginning of the queue of vdevs;

where the average physical free space of the selected vdev is below an over-provisioning threshold, (a) electing the first available vdev from the queue that possesses a garbage collection wait timer whose value is zero, (b) where the average physical free space of the elected vdev is below the over-provisioning threshold, initiating a garbage collection procedure on the elected logical device, (c) where the average physical free space of the elected vdev is above the over-provisioning threshold, performing the write operation on the elected vdev, and repeating (a), (b), and (c) until an elected vdev is above the over-provisioning threshold.

28. A computer readable medium storing computer readable instructions for machine execution of a method for processing a write operation for a solid-state drive (SSD) having solid-state memory, the method comprising:

determining one or more vdevs that have not exceeded an End of Life threshold, wherein the one or more vdevs that have not exceeded an End of Life threshold comprise a queue of vdevs;

determining a Program/Erase (P/E) count, an average physical free space, and a logical free space value for each vdev from the queue of vdevs;

identifying among the P/E counts a maximum P/E count and a minimum P/E count;

determining a difference in value between the maximum P/E count and minimum P/E count;

where the determined difference is greater than a P/E count threshold and the vdev with the minimum P/E count possesses sufficient logical free space for the write operation, performing the write operation on the vdev with the minimum P/E count;

where the determined difference is less than or equal to the P/E count threshold, selecting a vdev from the beginning of the queue of vdevs;

where the average physical free space of the selected vdev is greater than or equal to an over-provisioning threshold, performing the write operation on the vdev with the greatest logical free space value.

* * * * *